(12) United States Patent
Chi et al.

(10) Patent No.: US 7,493,346 B2
(45) Date of Patent: Feb. 17, 2009

(54) SYSTEM AND METHOD FOR LOAD SHEDDING IN DATA MINING AND KNOWLEDGE DISCOVERY FROM STREAM DATA

(75) Inventors: Yun Chi, Los Angeles, CA (US);
Haixun Wang, Irvington, NY (US);
Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/058,944

(22) Filed: Feb. 16, 2005

(65) Prior Publication Data
US 2006/0184527 A1 Aug. 17, 2006

(51) Int. Cl.
*G06F 12/00* (2006.01)
*G06F 17/30* (2006.01)
*G06F 9/46* (2006.01)

(52) U.S. Cl. .................. 707/200; 718/104; 718/105
(58) Field of Classification Search .................. 707/200; 718/104–105
See application file for complete search history.

(56) References Cited

U.S. PATENT DOCUMENTS

| | | | | |
|---|---|---|---|---|
| 3,842,249 A | * | 10/1974 | Geyer et al. | 700/295 |
| 4,347,575 A | * | 8/1982 | Gurr et al. | 700/295 |
| 6,041,354 A | * | 3/2000 | Biliris et al. | 709/226 |
| 6,385,638 B1 | * | 5/2002 | Baker-Harvey | 718/107 |
| 6,662,158 B1 | * | 12/2003 | Hon et al. | 704/252 |
| 7,096,154 B1 | * | 8/2006 | Andrade-Cetto | 702/181 |
| 7,203,622 B2 | * | 4/2007 | Pan et al. | 702/184 |
| 2003/0220860 A1 | * | 11/2003 | Heytens et al. | 705/35 |
| 2004/0062199 A1 | * | 4/2004 | Lau et al. | 370/230 |
| 2005/0114862 A1 | * | 5/2005 | Bisdikian et al. | 718/105 |

* cited by examiner

*Primary Examiner*—John E Breene
*Assistant Examiner*—Joshua Bullock
(74) *Attorney, Agent, or Firm*—Ference & Associates LLC

(57) ABSTRACT

Load shedding schemes for mining data streams. A scoring function is used to rank the importance of stream elements, and those elements with high importance are investigated. In the context of not knowing the exact feature values of a data stream, the use of a Markov model is proposed herein for predicting the feature distribution of a data stream. Based on the predicted feature distribution, one can make classification decisions to maximize the expected benefits. In addition, there is proposed herein the employment of a quality of decision (QoD) metric to measure the level of uncertainty in decisions and to guide load shedding. A load shedding scheme such as presented herein assigns available resources to multiple data streams to maximize the quality of classification decisions. Furthermore, such a load shedding scheme is able to learn and adapt to changing data characteristics in the data streams.

8 Claims, 7 Drawing Sheets

| Algorithm Loadstar($N'$, $C$) |
| --- |
|     inputs: data from $N'$ streams, |
|         and system capacity $C$; |
|     outputs: decisions $(\delta_1, \ldots, \delta_N)$; |
|     static variables: feature distributions $p(x)$'s, |
|         Markov-chains MC's, |
|         COR flags $(f_1, \ldots, f_N)$; |
| 1:     update $p(x)$ for each feature $x$ using its MC; |
| 2:     compute decisions $(\delta_1, \ldots, \delta_N)$ |
|         and QoD's $(q_1, \ldots, q_N)$ using $p(x)$'s; |
| 3:     select $C$ streams from $N'$ data streams |
|         based on $(q_1, \ldots, q_N)$ and $(f_1, \ldots, f_N)$; |
| 4:     for each selected stream $i$ do |
| 5:         observe the feature value for stream $i$; |
| 6:         revise $\delta_i$ for stream $i$; |
| 7:         revise $p_i(x)$ for stream $i$; |
| 8:*       if stream $i$ has had load in the |
|         previous time unit then |
| 9:*         update MC's for stream $i$; |
| 10:*       $f_i \leftarrow false$; |
| 11:*       else $f_i \leftarrow true$; |
| 12:    return $(\delta_1, \ldots, \delta_N)$; |

Fig. 3

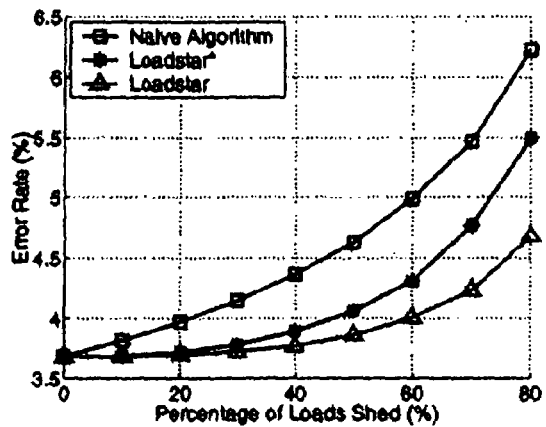 (a) $\delta_1$ and $Q_1$
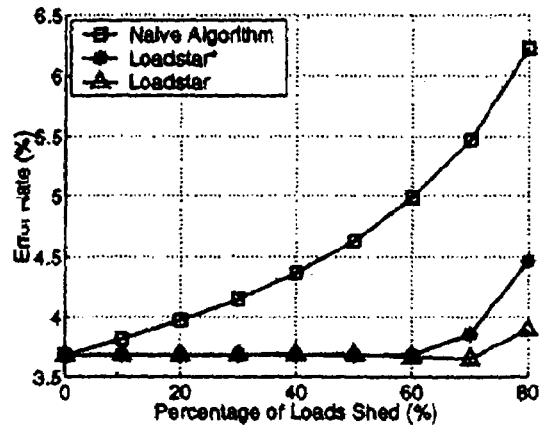 (b) $\delta_2$ and $Q_2$
Fig. 4
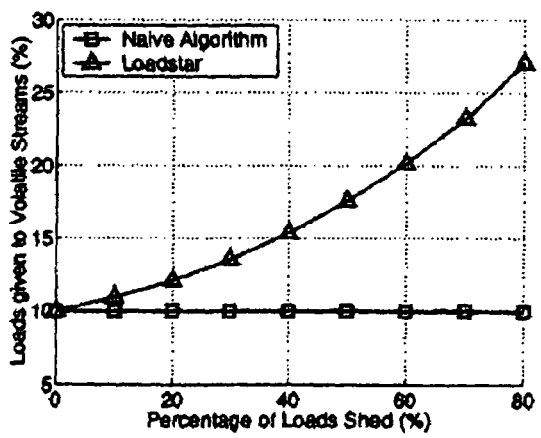 (a)
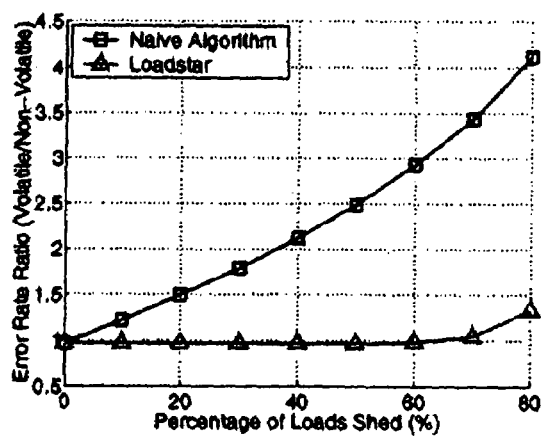 (b)
Fig. 5

(a) Without Learning (b) With Learning (a) 5 Points (b) 10 Points

SYSTEM AND METHOD FOR LOAD SHEDDING IN DATA MINING AND KNOWLEDGE DISCOVERY FROM STREAM DATA

FIELD OF THE INVENTION

The present invention relates generally to issues of resource allocation in mining single or multiple data streams.

BACKGROUND OF THE INVENTION

Many new applications process multiple data streams simultaneously. For instance, in a sensor network, data flows from a large number of embedded sensors; and in the stock market, each security corresponds to a stream of quotes and trades. In comparison to these unbounded, high speed incoming data, applications that handle multiple streams are constrained by limited resources (e.g., CPU cycles, bandwidth, and memory).

To solve this problem, much previous work has focused on allocating resources in a best-effort way so that performance degrades gracefully. Naturally, resource allocation can be formulated as an optimization problem. For instance, if the data characteristics from a sensor exhibit a predictable trend, then the precision constraints might be satisfied by transmitting only a fraction of the sensor data to the remote server.

Other approaches assume that a set of Quality-of-Service (QoS) specifications are available. A load shedding scheme derived from these specifications decides when and where to discard data, as well as how much data to discard, so that the system achieves the highest utility under the resource constraints.

However, a need has been recognized in connection with providing a more intelligent load shedding scheme for data mining tasks.

SUMMARY OF THE INVENTION

In accordance with at least one presently preferred embodiment of the present invention, there are broadly contemplated herein load shedding schemes for mining data streams wherein a scoring function is used to rank the importance of stream elements, and those elements with high importance are investigated. In the context of not knowing the exact feature values of a data stream, the use of a Markov model is proposed herein for predicting the feature distribution of a data stream. Based on the predicted feature distribution, one can make classification decisions to maximize the expected benefits. In addition, there is proposed herein the employment of a quality of decision (QoD) metric to measure the level of uncertainty in decisions and to guide load shedding. A load shedding scheme such as presented herein assigns available resources to multiple data streams to maximize the quality of classification decisions. Furthermore, such a load shedding scheme is able to learn and adapt to changing data characteristics in the data streams.

In summary, one aspect of the invention provides a method of providing load shedding in mining data streams, the method comprising the steps of: accepting data streams, the data streams containing data stream elements; ranking the importance of data stream elements; investigating data stream elements of higher importance; and thereafter shedding a plurality of data stream elements.

Another aspect of the invention provides an apparatus for providing load shedding in mining data streams, the apparatus comprising: an arrangement for accepting data streams, the data streams containing data stream elements; an arrangement for ranking the importance of data stream elements; an arrangement for investigating data stream elements of higher importance; and an arrangement for shedding a plurality of data stream elements.

Furthermore, an additional aspect of the invention provides a program storage device readable by machine, tangibly embodying a program of instructions executable by the machine to perform method steps for: accepting data streams, the data streams containing data stream elements; ranking the importance of data stream elements; investigating data stream elements of higher importance; and thereafter shedding a plurality of data stream elements.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 2($b$) illustrates the log ratio of the functions of FIG. 2($a$).

FIG. 3 provides pseudo-code for a Loadstar algorithm.

FIGS. 4($a$) and 4($b$) show error rates of a classifier under different levels of overload.

FIG. 5($a$) provides a plot of the percentage of observations that are assigned to the volatile data streams under different levels of load shedding.

FIG. 5($b$) shows the error rate ratio between a volatile family and non-volatile family, under different levels of load shedding.

DESCRIPTION OF THE PREFERRED EMBODIMENTS

Figure 1:
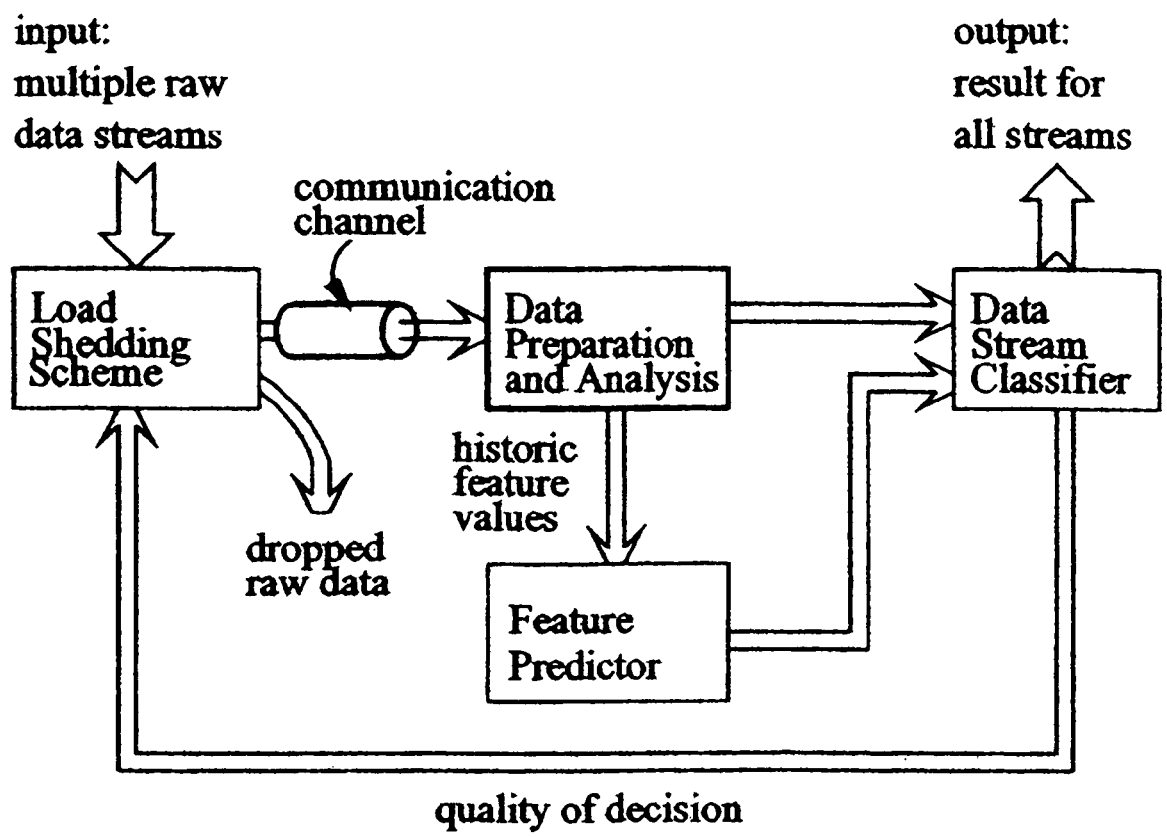
FIG. 1 illustrates major system components in accordance with an embodiment of the present invention.

Generally speaking, the goal of mining is more complex than achieving high precision of some simple computation (e.g. aggregates AVG, SUM, and COUNT). In those cases, high precision can usually be secured as long as the sample size is large enough. The benefits of mining, however, is not necessarily directly related to the amount of the mined data, nor is there a simple set of QoS measurements to instruct the mining process what data can be discarded without significant benefit loss.

By way of a "motivating example" that leads into the embodiments of the present invention, one may consider two cameras (we call them A and B) that are set up on two highways and transmit streams of snapshots to a central server; one snapshot is taken by each camera at each time unit; each snapshot from camera A contains a speeding car with probability $p_A$, independent of other snapshots and independent of camera B; similarly, each snapshot from camera B contains a speeding car with probability $p_B$. For simplicity, we skip defining the features and instead assume the classifier to be 100% accurate (i.e., it can detect a speeding car without any error). Assume that due to limited computational power, the central server is only able to investigate one out of the two snapshots at each time unit. The target is to design a load shedding scheme to catch as many speeding cars as possible in real time.

We now consider the following two load shedding schemes and derive the expected performance of each under the assumption that $p_A$ and $p_B$ are fixed but unknown to the load shedding mechanism.

Scheme 1: At each time unit, we randomly select one stream to investigate (i.e., each stream has a probability of ½ to be selected). The expected number of speeding cars caught in one time unit is $$E_1 = \frac{p_A + p_B}{2}$$

Note that this scheme gives the same result as a deterministic round-robin scheme.

Scheme 2: Instead of selecting streams randomly or in a round-robin manner, we select streams based on previous investigation results. We say a stream is promising if its last snapshot is determined to contain a speeding car. If the two streams are both promising or both unpromising, we assign each of them a probability $$q = \frac{1}{2};$$

otherwise, we assign a probability $$q > \frac{1}{2}$$

to the promising stream, and 1−q to the unpromising stream. We then choose streams by their assigned probability.

Using a Markov model, we derive $E_2$, the expected number of speeding cars caught in each time unit. We find that Scheme 2 performs better than Scheme 1 (or equally well if $p_A=p_B$), that is:

$$E_2 > E_1$$

Scheme 2 provides some intuition behind the load shedding schemes proposed herein in accordance with the embodiments of the present invention. First, by using the most recent historic data, Scheme 2 predicts the expected benefits of a data stream (in terms of the number of speeding cars caught per investigation) given we assign the resource to the data stream. Then with higher probability, Scheme 2 allocates the available resource to the data stream with higher expected benefits. Therefore, the overall expected benefits will be higher than that of Scheme 1. Second, Scheme 2 does not explicitly depend on the parameters ($p_A$ and $p_B$), and therefore if data characteristics change with time (e.g., $p_A$ and $p_B$ change as traffic conditions change in the two highway locations), the scheme will adapt to the new environment. Here we assume that $p_A$ and $p_B$ are changing slowly with respect to the rate at which snapshots are taken. Using a Markov model, we can derive $p_A$ and $p_B$ which are considered constant for many state transitions. These are some of the key properties that may be preferably sought in accordance with a load shedding design in accordance with the embodiments of the present invention.

However, there are many overly simplified assumptions in this example and in Scheme 2. First, the example assumes only two data streams, where in real applications, there could easily be hundreds and thousands of data streams. Second, the example assumes a single parameter ($p_A$ or $p_B$) is enough to model the data characteristics of a data stream. Third, the example assumes a classifier with 100% accuracy, and in addition, it assumes that the real class labels are readily available to guide load shedding, and both assumptions are not practical in many real applications. Fourth, the example assumes that we only care about catching speeding cars and we do not have to make any claim about the snapshots that we did not investigate; however, in real applications, it is more often than not that there are multiple class labels, and we have to make a decision about a data stream even if we shed load from the stream. Also we typically care about the overall classification error rate, and not that of a particular class. Herebelow, all of these issues will be considered in presenting embodiments of the present invention.

Briefly described herebelow are the major challenges of load shedding in mining data streams.

Generally, load shedding in mining data streams is a new topic and it raises many challenges. Although it has been studied for managing data streams, many assumptions in these studies are not appropriate for data mining tasks.

First, for many simple queries (e.g., aggregates) considered in managing data streams, it is often safe to assume that the quality of the query result depends only on the sample size. Some approaches even assume simple (e.g., monotonic, or even concave or piecewise linear) QoS curves, which depict the relationship between the quality and the sample size, and are available to the load shedding mechanism. In contrast, in mining data streams, sample size itself cannot guarantee good mining result, because the quality of mining often depends on concrete feature values in a non-monotonic way. For example, in certain regions of the feature space, a classifier may have very high confidence in its classification decision, even if the feature value is only known approximately (e.g., as a distribution). But in other regions, the classifier may not be very sure about its classification decision because in these regions, a small variation in a feature value may change the decision. In this case, it can be of benefit to allocate resources (i.e., computing the exact feature values) to a data stream if the decision is more sensitive to the feature value of this data stream. Thus, the challenge lies in determining how best to make the resource allocation to minimize classification errors.

Second, most load shedding approaches in managing data streams assume data characteristics are stable. Data mining applications, however, are often more sensitive to changes in data characteristics. For instance, a small move in the feature space may totally change the classification results, and more often than not, it is such changes that we care about the most. Thus, feature value prediction (in the face of load shedding) is important to load shedding design for mining data streams. Fortunately, many feature values (e.g, the reading of sensors that measure the temperature or the water level of a river, the feature values extracted from consecutive satellite images, or the interest rates that are adjusted over time) have strong time-correlation and we can build models to take advantage of such correlation. Thus, the challenge lies in building a feature predictor that is able to capture the time-correlation and adapt to the time-variance of the feature values.

At least the following strides are made in accordance with the embodiments of the present invention as broadly contemplated herein:

(1) We define two quality of decision (QoD) measures for classification based on the predicted distribution of the feature values in the next time unit.

(2) We develop a prediction model for feature values using Markov models whose parameters can be updated in real time to reflect parameter changes.

(3) We combine the first two to obtain a load shedding scheme, Loadstar (A Load Shedding Scheme for Streaming Data Classifiers), for classifying multiple data streams. Experiments on both synthetic data and real-life data show that load shedding schemes in accordance with at least one embodiment of the present invention are effective in improving the accuracy of data stream classification in the face of system overload.

Major system components in accordance with an embodiment of the present invention are illustrated in FIG. 1. Raw data flows in via multiple streams and are fed to the data preparation and analysis block through a communication channel. The data preparation and analysis block is responsible for data cleaning, feature extraction composition, etc. The derived features enter the data classification block, which outputs mining results.

In accordance with at least one embodiment of the present invention, it is assumed that data preparation and analysis is CPU intensive. In comparison, the CPU consumption for classification is negligible. This is true in many real applications especially those that handle multimedia data, for which feature extraction is usually a CPU intensive procedure. For example, if the raw data are text documents, the data preparation and analysis may involve removing stop words, counting the frequency of important words, projecting the vector of frequencies to some pre-defined conceptual space, filtering the projected values in each dimension using thresholds, etc; if the raw data are images from satellites, computing the features, such as luminance, shape descriptor, amplitude histogram, color histogram and spatial frequency spectra, will usually take much CPU time. As a result, when the system is overloaded, the data preparation and analysis block cannot process all of the data and load shedding is needed. (Another equivalent scenario is when the bandwidth of the communication channel is limited and therefore not all raw data can be transmitted to the data preparation and analysis block.)

The input to the system involves multiple streams of raw data. When the system is overloaded, data from some of the streams are dropped. For those streams whose data is dropped, their feature values can be predicted by the feature predictor block, based on historic feature values. Therefore, the classifier will handle both the real feature values generated by the data preparation and analysis block, and predicted feature values for those streams whose data has been dropped.

We assume that the classifier handles data streams consisting of a d-dimensional feature vector $x \in X^d$ ($x_i$ can be either continuous or categorical) and produces a class label $c_i \in c_i, \ldots, c_K$. The classifier performs classification for each incoming x no matter whether x is real or predicted feature values. The objective is to design a load shedding scheme that minimizes the overall error rate of the data mining task when the system is overloaded.

In accordance with at least one embodiment of the present invention, we restrict the data mining task to be the classification problem, although the technique can be easily extended to other data mining tasks, such as clustering and mining association rules, on data streams.

Load shedding takes place when data from multiple streams exceeds the processing capacity. A good load shedding scheme ensures that the shed load has minimal impact on the benefits of mining.

Thus, we need a measure of benefit loss if data x from a certain stream is discarded. However, we must be able to do that without seeing x's the real feature values. Herebelow, there are proposed two QoD metrics, and even further below there is presented a method to predict feature values such that we can make load-shedding decisions before seeing the real data.

One way to view a classifier is to consider it as a set of discriminant functions $f_i \, x$, $i=1 \ldots K$. The classifier assigns class label $c_k$ to x if $f_k x \geq f_i x$, $\forall i$. For traditional classification, only the ranks of the discriminant functions are important in decision making, i.e., we only care if we are right or wrong, and do not care how far off we are.

Consider an example where there are two classes and the data is one dimensional (i.e., there is a single feature x). FIG. 2(a) shows the two discriminant functions and FIG. 2(b) their log ratio. We use logarithmic values because first, logarithm is a monotonically increasing function which preserves the original ranks of the discriminant functions; second, the ratio is invariant with the respect to the scale; third, as we will see shortly, it makes computations simpler.

For a given feature value x, if $f_2 \, x$ is greater than $f_1 \, x$, we assign class label $c_2$ to x; we do not care how much $f_2 \, x$ is greater than $f_1 \, x$. For example, for two data streams whose feature values are x=2 and x=1.5, respectively, they are both classified as $c_2$. However, when the feature values are not exact, the two classification decisions will have different levels of certainty. For example, assume that x=2 and x=1.5 are current feature values and we believe x will not change dramatically in the next step. In such a case, if the classifier has to make a classification decision for the next step without updated feature values, it may still assign class label $c_2$ to both data streams; however, in this case, for the data stream with x=2, the classifier is much more certain about its decision than for the data stream with x=1.5. Intuitively, the quality of the classification decision for the first data stream is higher than that of the second data stream. If we have to shed load in the next step, we should shed load from the data stream whose current feature value is x=2, because by allocating the available resource to the data stream with less quality of decision (i.e., the data stream with current feature value x=1.5), we expect to gain more benefits in term of the improvement in the classification accuracy.

The question is, how to quantify this quality of decision?

Assume we have derived a probability density function for X, the feature value in he next time unit:

$$X \sim p \, x \qquad (3.1)$$

It is worth mentioning that p(x) is different from the estimated prior distribution p x|D that can be obtained from the training data D. When we build the classifier based on D, we consider each observation in D as an independent sample from an unknown distribution. Here by p(x), we mean that through some mechanism (e.g., by taking advantage of the temporal locality of the data), we have obtained an estimation of the feature value of the next time unit, and it is in the form of a density p(x).

Quality Defined on Log Ratio

We assume that the discriminant functions have positive values. Using Eq (3.1), the distribution of feature values in the next time unit, we can compute the expected logarithmic value of the discriminant functions:

$$E_x \log f_i x = \int_x \log f_i x p x d x \quad (3.2)$$

We use $\delta_1$ to represent the decision which chooses the class label that maximizes the expected value:

$$\delta_1 : k = \arg_i \max E_x \log f_i x \quad (3.3)$$

Eq (3.3) only gives the classifying decision; to perform load shedding, we need to give a quantitative measure about the certainty of the decision. We introduce our first quality of decision (QoD) measure:

$$Q_1 = E_x \log \left( \frac{f_k x}{f_{\bar{k}} x} \right) \quad (3.4)$$
$$= E_x \log f_k x - E_x \log f_{\bar{k}} x$$

where $\bar{k}$ is the second best decision according to Eq (3.2).

From the definition, we have $Q_1 \geq 0$. Intuitively, the higher the $Q_1$, the more we are confident in our best-effort decision, that is, we compare our decision with the second-best choice, and if the expected performance of our decision is much better than that of the second-best choice, we believe that our decision has high quality.

We introduce another quality of decision measure based on Bayesian decision theory. We use the posterior distribution of the classes given the feature vectors as the discriminant functions. At point x in feature space X, if we decide the class is $c_i$, then the conditional risk of our decision is $$R c_i | x = \sum_{j=1}^{K} \sigma c_i | c_j P c_j | x$$

where $\sigma c_i | c_j$ is the loss function, i.e., the penalty incurred when the real class is $c_j$ and our decision is $c_i$. For example, for zero-one loss, we have:

$$\sigma c_i | c_j = \begin{cases} 0 & i = j \\ 1 & i \neq j \end{cases}$$

in which case we can simplify the conditional risk as $$R c_i | x = 1 - P c_i | x$$

Because we have the distribution of the feature value x at the next time unit, we can compute the expected risk for a decision for next time unit as $$E_x[R c_i | x] = \int_x R c_i | x p x d x$$

We use $\delta_2$ to represent the best-effort decision rule which minimizes this expected risk:

$$\delta_2 : k = \arg_i \min E_x[R c_i | x] \quad (3.5)$$

Assume for $x \in X$, the optimal decision is $c^*$. Because the real value of x is unknown, $c^*$ is infeasible to realize in our load shedding environment. The risk associated with $c^*$ is $$E_x[R c^* | x] = \int_x R c^* | x p x d x$$

This risk is the Bayesian lower bound based on distribution p(x). We then define the QoD based on the difference between the expected risk and the lower bound:

$$Q_2 = 1 - E_x[R c_k | x] - E_x[R c^* | x] \quad (3.6)$$
$$= 1 - \int_x [P c^* | x - P c_k | x] p x d x$$

From the definition, we have $0 \leq Q_2 \leq 1$. Also, $Q_2 = 1$ if and only if $c_k$ is the optimal decision for every $x \in X$ where $p(x) > 0$. Intuitively, the larger the $Q_2$, the higher quality the decision.

Figure 2:
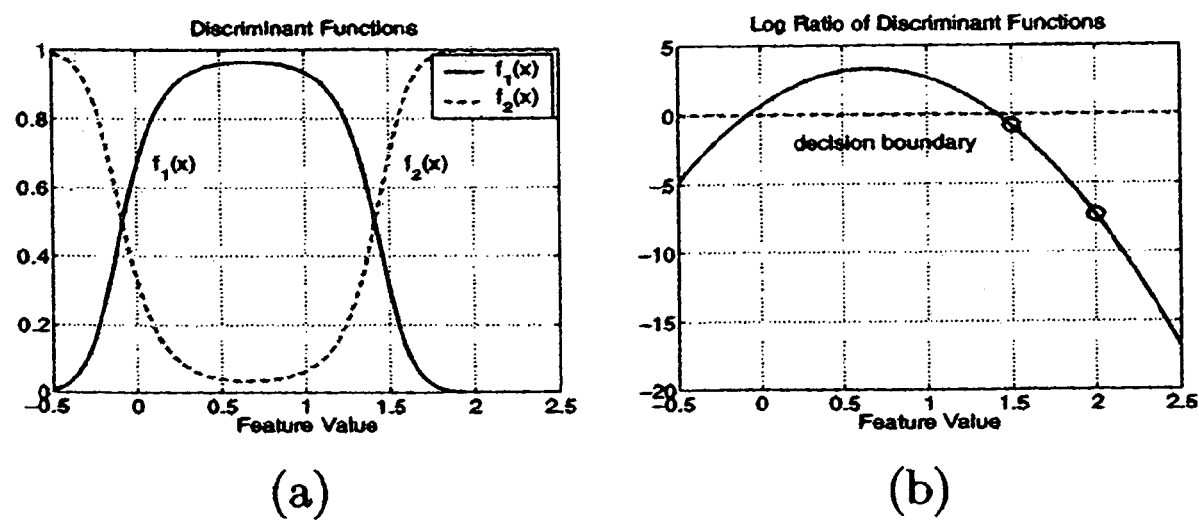
FIG. 2($a$) illustrates two discriminant functions.

We compare the two qualities of decision. The quality of classification depends on two factors. The first factor is the feature distribution p(x). Both $Q_1$ and $Q_2$ have taken p(x) into consideration. For example, as shown in FIG. 2, we are quite confident that if x=1, then the class is $c_1$, and if x=2 then the class is $c_2$. If p(x) is given by P(x=1)=P(x=2)=0.5, then both $Q_1$ and $Q_2$ will give low values. Thus, resources allocated to the stream (which helps to reveal the real feature values) will improve the quality of decision.

The second factor is the discriminant functions. In this case, although both $Q_1$ and $Q_2$ reflect the quality of decision, $Q_2$ is a better metric, because it indicates the benefit of allocating resources to the data stream. For example, consider an extreme case where $f_1(x) = f_2(x) = 0.5$ for all x. Then, $Q_1$ is 0, which (correctly) indicates that the classification result is very unreliable. $Q_2$ is 1, which (also correctly) indicates that allocating more resources to the data stream will not improve the accuracy of the classification.

The QoDs defined above are mathematically appealing but computationally challenging, especially when the dimension of the feature space d is large. In this section, we simplify the problem by assuming that each feature is conditionally independent given the class labels. With this assumption, a very simple classifier, the naive Bayesian classifier, can be applied. In spite of its naivety, it has been shown in many studies that the performance of naive Bayesian classifiers are competitive with other sophisticated classifiers (such as decision trees, nearest-neighbor methods, etc.) for a large range of data sets.

In the following, we assume features are conditionally independent. The discussions in the previous sections are valid for the general case. Also, because of the "Bayesian" assumption, we restrict our discriminant function to be the posterior distribution of each class. However, for $\delta_1$ and $Q_1$, the discriminant functions could be any positive functions on the feature space.

For $Q_1$, with the assumption of a naive Bayesian classifier, we have $$E_x \log f_i x = E_x \log P c_i | x$$
$$= E_x \left( \log \frac{P x | c_i P c_i}{\sum_j P x | c_j P c_j} \right)$$

The classifying decision and the QoD only depend on the relative value. So we ignore the denominator.

$$\begin{aligned} E_x[\log P x \mid c_i \, P c_i] &= E_x \log P x \mid c_i + E_x \log P c_i \\ &= E_x \sum_j \log P x_j \mid c_i + \log P c_i \\ &= \sum_j E_x \log P x_j \mid c_i + \log P c_i \\ &= \sum_j E_{x_j} \log P x_j \mid c_i + \log P c_i \end{aligned}$$

Thus we only need the distribution of each feature $X_i \sim p\, x_i$ instead of the joint density function $X \sim p\, x$ to make the decision and to compute the QoD.

For $Q_2$, with the assumption of a naive Bayesian classifier, we have $$\begin{aligned} Q_2 &= 1 - \int_x \left[ \frac{P x \mid c^* \, P c^* - P x \mid c_k \, P c_k}{\sum_j P x \mid c_j P c_j} \right] p\, xdx \\ &= 1 - \int_x \left[ \frac{\prod_i P x_i \mid c^* \, P c^* - \prod_i P x_i \mid c_k \, P c_k}{\sum_j \prod_i P x_i \mid c_j P c_j} \right] p\, xdx \end{aligned}$$

Hereabove, it was assumed that we know the distribution of the feature values when their real values are not available. The computation of the QoD and the choice of load shedding are based on the distribution. Herebelow, we study how to obtain the feature distribution.

If the feature values of the current time is independent of those in the next time unit, the best we can do is to use the prior distribution of the feature values. In such a case, the quality of decision for each classifier will not change with time. This is commonly assumed in data stream management systems, where data-value histograms are often created to assistant query answering.

However, in many real life applications, feature values often have short-term temporal correlation. For example, temperatures of a region and water levels of a river usually do not change dramatically over a short period of time. Feature values extracted from consecutive satellite images also have strong temporal correlation. On the other hand, data characteristics of a stream usually change with time. Thus, our task is to capture short-term time correlation in a time-varying environment.

Herebelow, we propose a finite-memory Markov model and introduce an algorithm to incrementally update the Markov model so that it reflects the characteristics of the most recent data.

Markov models have been used extensively in many fields to model stochastic processes. In this study, we use discrete-time Markov-chains with a finite number of states. A discrete-time Markov-chain is defined over a set of M states $s_1, \ldots, s_M$, and an M×M state transition probability matrix P, where $P_{ij}$ is the probability of transition from state $s_i$ to $s_j$. We use one Markov-chain for each feature in each data stream. The Markov-chains are used to model both categorical and numerical features. For continuous values, we discretize them into finite number of bins.

Consider any feature x and its corresponding Markov-chain. Assume the feature value at time $t_0$ is known to us, and we have $x=s_i$, $1 \leq i \leq M$. Thus, the distribution of the feature value at $t_0$ is $p_0 x = e_i$, where $e_i$ is a 1×M unit row vector with 1 at position i and 0's at other positions. The distribution of the feature value in the next time unit $t_1$ is $p_1 x = p_0 \times P = e_i P$, where P is the state transition probability matrix. In the next time unit $t_2$, the distribution of the feature value becomes $p_2 x = p_1 \times P = e_i P^2$.

If we shed load at time $t_1$, $p_1 x$ will give us a distribution of the value of x at $t_1$. At time $t_1$, the distribution is $p_1 x$. When i becomes large, the distribution will converge to $p x = \pi$, where $\pi$ is the steady-state solution of the Markov-chain, i.e., $\pi$ is the solution to $$\begin{cases} \pi = \pi P, \\ \sum_j \pi_j = 1. \end{cases}$$

It is clear that $\pi$ is the prior distribution (among the historic data based on which we have built the Markov-chain) of the feature values. In other words, the probability of a certain feature value in the next time unit is approximately the fraction of its occurrence in the historic data. This makes sense, because as the gap between the current time and the time when we last investigated the feature values becomes larger, the temporal correlation will disappear.

In this study, we assume that for a given data stream, the Markov-chains for the features are independent. In other words, we assume that given the feature values of the data stream at current time, the distribution of each feature of next time unit is independent of the distributions of other features. This assumption makes it easier for us to solve the problem (e.g., to compute $\delta_2$ and $Q_2$) numerically by using, e.g., Monte Carlo methods. Without this assumption, we have to use some special sampling technique (e.g., for the Gibbs sampler, we need the marginal distribution for each feature given all other features), with the independence assumption, sampling is easier, i.e., we can draw samples for each feature following its own distribution, independent of other features.

An important issue in data stream is time-variation, i.e., the data characteristics may drift with time. To handle this phenomena, we adopt a finite-memory Markov-chain model and incrementally update its parameters so that they reflect the characteristics of the most recent data. The main idea is to maintain the Markov-chains using a sliding window of the most recent W transitions and update the parameters of the Markov-chains when new observations are available.

First, we consider a simple case in which there is no load shedding. At time t, the most recent W+1 states are s t−W, ..., s t−1, s t, and these W+1 states contain W transitions, i.e., from s t' to s t'+1 for t−W≤t'<t. Assume s t−W, ..., s t−1, s t are generated by a Markov-chain P, it can be shown easily that the maximum-likelihood estimation (MLE) for $P_{ij}$ is $$\hat{P}_{ij} = \frac{n_{ij}}{\sum_k n_{ik}} \quad (4.7)$$

where $n_{ij}$ is the number of observed transitions from state $s_i$ to $s_j$ among the W transitions. To obtain the MLE, we only need to maintain a matrix $\overline{P}$ of M×M counters and update the entries using the most recent observations. For example, assume that s t−W=$s_p$, s t−W+1=$s_q$, s t=$s_i$, and at time t+1, a new observation becomes available and s t+1=$s_j$. To update $\overline{P}$, we increase $\bar{P}_{ij}$ by 1 as we insert $s_j$ into the window, and decrease $\bar{P}_{pq}$ by 1 as we remove $s_p$ from the sliding window. To get the MLE, we multiply each row of $\bar{P}$ by a normalizing factor to make the row sum to 1.

However, when load shedding takes place, we may not have consecutive observations When load shedding is frequent, the observations could be very sparse. To obtain the maximum-likelihood estimation of the parameters based on observations with missing values, we can use, for example, the EM algorithm to compute the unobserved feature values. However, iterative algorithms such as EM are time-consuming, which makes them unacceptable for data stream applications. In addition, such algorithms very often only converge to local maximums.

To solve this problem, we use an approximate approach to update the parameters of the Markov-chains: for each data stream, we maintain a flag to indicate if it has been observed in the previous time unit (we say that a data stream is observed or it gets an observation at time t if we do not shed load from the data stream at time t); if at time t, a data stream is observed, and it was not observed at time t−1, then we will observe the data stream in two consecutive time units (i.e., t and t+1), whenever possible. In such a case, we say that the data stream has a consecutive observation request (COR) at time t. If all CORs are satisfied, the observations from a data stream will be in pairs of consecutive states, with possible gaps among the pairs. Therefore, instead of maintaining W+1 most recent states, we maintain in the sliding window the most recent W transitions, where each transition consists of a pair of states ($s_{from}$, $s_{to}$). The method to compute and update $\bar{P}$ is similar to the one introduced above, and we still use Eq (4.7) to estimate the P matrix for a Markov-chain, knowing that it is just an approximation. Furthermore, because the memory of the Markov-chains is finite, it is possible that some rows of $\bar{P}$ are zero vectors. To handle this case and to represent certain prior knowledge about the models, in our implementation we added some pseudo-counts to $\bar{P}$, i.e., instead of all zeros, some counters in the $\bar{P}$ matrix (e.g., those on diagonal) are initialized with some small positive integers.

A load shedding scheme in accordance with at least one embodiment of the present invention, Loadstar, is based on the two components introduced in the previous two sections, i.e., the quality of decision and the predicted distribution in the feature space. Pseudo-code for the Loadstar algorithm is given in FIG. 3. The inputs to the algorithm are i) N' data streams that contain data at time t N'≦N, and ii) the capacity C of the system, in terms of the number of data streams that the system can handle, at time t. When N'>C, load shedding is needed. The outputs of the algorithm are the decision of the classifier for each data stream at time t.

FIG. 3 actually contains two versions of our load shedding scheme: the basic Loadstar algorithm (without lines 8-11), in which the parameters of Markov-chains are fixed, and the extended version (with lines 8-11), which we call Loadstar*, in which the parameters of Markov-chains are updated in real time. For the basic version Loadstar, we assume that the parameters of Markov-chains do not drift with time so they are learned from training data; for the extended version Loadstar*, we assume that the parameters of Markov-chains drift with time and they are updated using the most recent observations.

Some internal variables are maintained as static by the algorithm. Among them, p(x)'s are the distributions of the features in the current time unit; MC's represent the Markov-chains learned from training data for Loadstar or the Markov-chains in the current time unit for Loadstar*; $f_1, \ldots, f_N$ are a vector of COR flags for the data streams in Loadstar*, and in Loadstar, they are all set to false.

At time t−1, the feature distributions at time t are predicted by updating the p(x)'s using the Markov-chains (line 1). Each stream first assumes that it will not be observed at time t; it computes the decisions using Eq (3.3) or Eq (3.5) and the qualities of decision using Eq (3.4) or Eq (3.6), both based on the predicted feature distributions (line 2). Then when N' and C are available at time t, if N'>C, load shedding is applied. C streams are selected to be observed based on the COR flags and the QoDs: if among the N' data streams, the number of streams with true COR flags is less than C, then their requests are fulfilled first and the remaining resources are assigned to other streams based on their QoDs; otherwise, the C streams will be only selected from the data streams whose COR flags are true, based on their QoDs (line 3). When deciding which streams to be observed based on QoDs, we use a weighted randomized algorithms where the chance for a stream to be observed is inversely proportional to its QoD value. We choose to use a randomized scheme in order to avoid starvation of a data stream. For the data streams that are observed, because they obtain the real feature values, their feature distributions are changed to unit vector $e_i$ 's, where the i-th element (i depends on the feature value) of $e_i$ is 1, others are 0's, and their classification decisions are updated using the new feature distributions (lines 5-7). For Loadstar*, after the data streams to be observed are selected, their COR flags are updated, and if necessarily, their MC's are updated (lines 8-11). Finally, the classification decisions are returned (line 12).

Herebelow, we use both synthetic and real-life data sets to study the performance of the Loadstar algorithm. We compare Loadstar with a naive algorithm, in which loads are shed from each data stream equally likely. Both algorithms are implemented in C++. In the experiment setup, for easy of study, instead of varying loads, we fix the load (to be 100 data streams for both the synthetic and the real-life data sets) and change the number of data streams that the system can handle at each time unit. In other words, we study the system under different levels of overloads. In addition, because of the random nature of the algorithms, for all the experiments we run 10 times with different random seeds and report the average values.

By using synthetic data, we sought to answer the following experimental questions about our load shedding algorithm:

(1) Does Loadstar improve the performance over the naive algorithm? If so, how is the improvement achieved?

(2) Do the Markov-chains capture the models of feature space accurately? Do they adapt to drifts of data characteristics?

We generate data for 100 data streams, and for each data stream, we set the number of features d to be 3. Among the three features, $x_1$ and $x_2$ are numerical and $x_3$ is categorical. The two numerical features are generated using the following random walk model:

$$x_t = x_{t-1} + \epsilon, \text{ where } \epsilon \sim N\, 0, \sigma^2 \quad (6.8)$$

where $N\, \mu, \sigma^2$ is a Normal distribution with mean $\mu$ and variance $\sigma^2$. In addition, we add boundaries at 0 and 1 in the random walk model, i.e., at a given time unit t, if $x_t > 1$ or $x_t < 0$, we switch the sign of the corresponding $\epsilon$ and make $x_t$ between 0 and 1. We partition the 100 streams into two families: for the first family, which consists of 10 data streams, the $\sigma$ in Eq (6.8) is set to be 0.1; for the second family, which consists of 90 data streams, $\sigma = 0.01$. For obvious reasons, we call the first family the volatile streams and the second family the non-volatile streams. As can be seen soon, such a setup reveals the mechanics that Loadstar uses to obtain good performance. For the categorical feature $x_3$, which consists of 4 distinct values $s_1, \ldots, s_4$, all data streams have the same characteristics: the feature values are generated as time series using a Markov-chain whose P matrix has the following form: the element on diagonal is 0.91 and all other elements have value 0.03.

To generate the model for the classification problem, we use two class labels, + and −, and we assume the features to be independent given the class label. For the two numerical features, their likelihood functions are given as $p\, x_1|+\sim N\, 0.2, 0.1^2, p\, x_1|-\sim N\, 0.8, 0.1^2, p\, x_2|+\sim N\, 0.8, 0.1^2,$ and $p\, x_2|-\sim N\, 0.2, 0.1^2$. For the categorical feature $x_3$, its likelihood functions are given as $p\, s_1|+=p\, s_3|+=0.4,\ p\, s_2|+=p\, s_4|+=0.1,\ p\, s_1|-=p\, s_3|-=0.1,$ and $p\, s_2|-=p\, s_4|-=0.4$. Because of the symmetry of the model, we assume that the prior distribution for the two classes to be equally likely. Finally, the real class label for each feature triplet is assigned to be the class that has higher joint posterior distribution value.

We generate data for 11,000 time units, where data for each time unit consists of 100 observations for the 100 data streams. Data in the first 6,000 time units are used as training data to build a naive Bayesian classifier. For the naive Bayesian classifier, we use 10 bins with equal width to discretize the two features with numerical values. Although our algorithm allows each data stream to have its own classifier, for simplicity, in the experiments we use a single naive Bayesian classifier for all data streams. Data in the last 5,000 time units are used as test data. We set the window size W for Markov-chain learning in Loadstar* to be 100.

Also compared are Loadstar (and its extension, Loadstar*) with the naive algorithm in terms of error rates under different levels of overload. For this, we fix the load to be 100 data streams, and increase the number of data streams to have loads shed at each time unit from 0 to 80. FIG. 4(a) and FIG. 4(b) show the error rates of the classifier under different levels of overload, using $\delta_1$, $Q_1$ and $\delta_2$, $Q_2$, respectively.

From the figures we can see that in both cases Loadstar has lower error rates than the naive algorithm under different levels of overload. Loadstar that uses $\delta_2$ and $Q_2$ has better performance that that uses $\delta_1$ and $Q_1$. In particular, for the former one, when the percentage of loads shed is under 70%, the error rate remains the same as that of the case with no load shedding. Because of this, in the remaining discussion, we focus on $\delta_2$ and $Q_2$. Also can be seen from the figures, the error rates of Loadstar* are higher than those of Loadstar. This result is not unexpected, because for learning Markov-chains, Loadstar* requires consecutive observations. That is, with 80% loads shed, for Loadstar, on average each data stream is observed every 5 time units; for Loadstar*, each stream is observed consecutively every 10 time units. As we know, because of the temporal locality, consecutive observations every 10 time units does not provide as much information as two separate observations with distance of 5 time units.

To shed light on the reasons for Loadstar's good performance, in FIG. 5(a) we plot the percentage of observations that are assigned to the volatile data streams under different levels of load shedding. As can be seen from the figure, the naive algorithm always assigns 10% observations to the volatile streams because there are 10 out of 100 data streams that are volatile. In contrast, for Loadstar, as the number of available observations becomes smaller, a higher fraction of them are assigned to the volatile streams. For example, when there are only 20 observations available, on average, at each time unit the naive algorithm assigns 2 of them to the volatile streams, but Loadstar assigns more than 5 observations to the volatile streams.

In addition, we compute the error rates for the volatile and non-volatile families separately. FIG. 5(b) shows the error rate ratio between the volatile family and the non-volatile family, under different levels of load shedding. As can be seen, for the naive algorithm, because it sheds loads from all data streams equally likely without considering their data characteristics, as the percentage of load shedding increases, the error rate of the volatile family suffers more and more comparing to that of the non-volatile family; in contrast, for Loadstar, because the quality of decision automatically includes the characteristics of data into consideration, the error rate ratio between the two families remains around 1 until the percentage of load shedding increases to 60%, and does not go beyond 1.5 even when the percentage of load shedding increases to 80%.

In summary, when different data streams have different characteristics, Loadstar is more fair in that it gives more available resources to the data streams that are more uncertain, and as a result, it balances the error rates among the data streams with different characteristics and achieves better overall performance.

In another experiment, there is studied the Markov-chain learning part of our load shedding scheme. We generate the data streams such that $x_3$ has time-varying characteristics, using the following two Markov-chains:

$$P_A = \begin{bmatrix} .91 & .03 & .03 & .03 \\ .03 & .91 & .03 & .03 \\ .03 & .03 & .91 & .03 \\ .03 & .03 & .03 & .91 \end{bmatrix}, P_B = \begin{bmatrix} .25 & .25 & .25 & .25 \\ .25 & .25 & .25 & .25 \\ .25 & .25 & .25 & .25 \\ .25 & .25 & .25 & .25 \end{bmatrix}$$

For the test data, for the first 1,000 time unit, we generate $x_3$ using $P_A$ ($P_A$ is also used to generate the training data); then at time unit 1,000, we switch to $P_B$; finally, at time unit 3,000, we switch back to $P_A$.

To quantify the performance of Markov-chain learning, we use the Kullback-Leibler divergence as the measure of error. Notice that each row $P_i$ of the P matrix is a distribution; in our algorithm, we have a estimation matrix $\hat{P}$ and each row $\hat{P}_i$ of $\hat{P}$ is also a distribution. To see if the two distributions are near to each other, we compute their Kullback-Leibler divergence d $$P_i, \hat{P}_i = \sum_j P_{ij} \log\left(\frac{P_{ij}}{\hat{P}_{ij}}\right).$$

Figure 6:
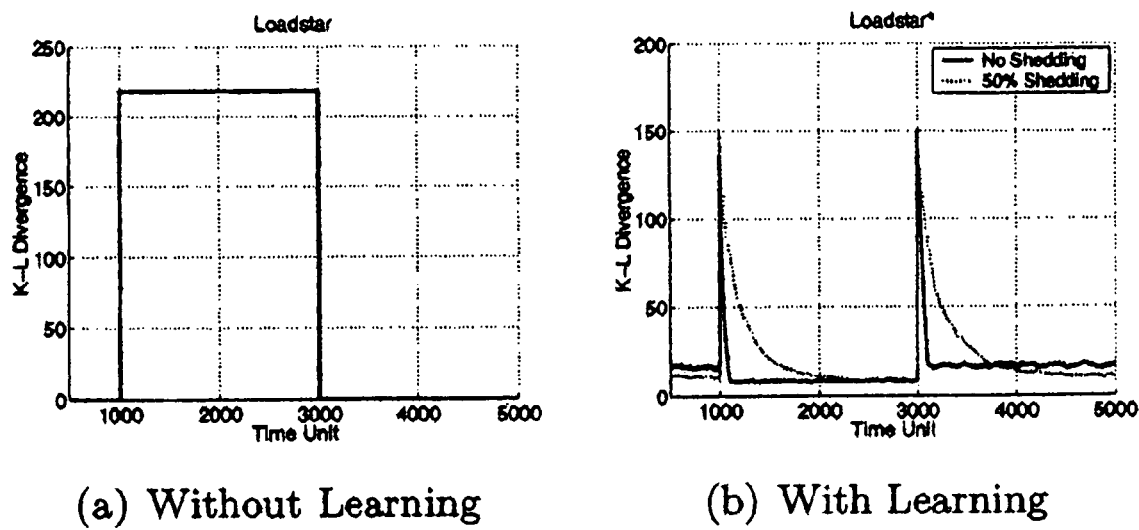
FIGS. 6($a$) and 6($b$) convey further experimental results for Loadstar and Loadstar*.

And finally, we sum the Kullback-Leibler divergences over all the rows and all the data streams. FIG. 6 shows the results over time units 500 to 5,000 for Loadstar and Loadstar*. For Loadstar*, we report the results for two cases: the case in which there is no load shedding and the case in which there is 50% load shedding.

As can be seen from FIG. 6(a), because Loadstar learns the parameters of Markov-chains from the training data and because $P_A$ is used to generate the training data, before time 1,000, the error is very small; the error increases sharply when the parameters are changed at time 1,000, and remains high until at time 3,000, when the original parameters are restored. In contrast, as can be seen from FIG. 6(b), Loadstar* can learn the new parameters of Markov-chains in real time: when the parameter change happens, the error of Loadstar* also increases sharply; however, when there is no load shedding, as we expected, after 100 time units (which is the sliding window size W), the new parameters are learned and the error drops back; this learning takes longer time for the case of 50% load shedding.

It is interesting to observe from FIG. 6(b) that when the Markov-chain has parameter $P_A$, Loadstar* has more accurate estimation for the parameters when there is 50% load shedding than when there is no load shedding. To explain this, we have to see the difference between the two cases: in the case of no load shedding, data from the most recent 100 time units are used to learn the parameter; in the case of 50% load shedding, on average, samples from the most recent 200 time units are used. When the distributions are skewed (e.g., $P_A$), the temporal locality prevents us from learning the parameter very accurately using only 100 time units; when there is 50% load shedding, samples are drawn from longer history (on average 200 time units) and therefore the parameters can be learned more accurately. To verify this, we look at FIG. 6(b) between time units 2,000 and 3,000. During this period, $P_B$ is used and from the parameters we can see that when $P_B$ is used, there is no temporal locality at all. Therefore, as expected, during this period both cases learned the parameters equally accurately.

Figure 7:
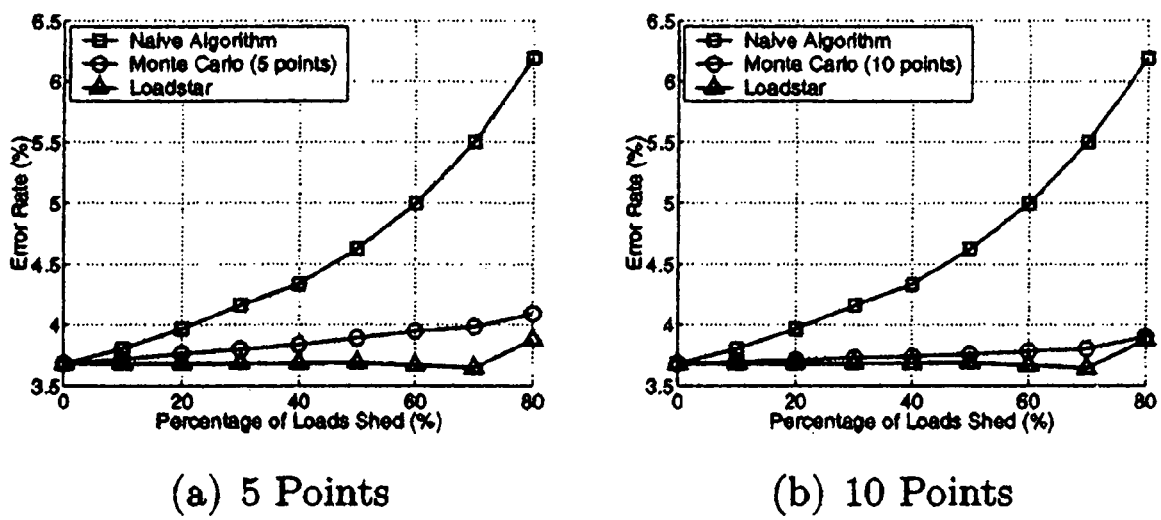
FIGS. 7($a$) and 7($b$) convey results from a Monte Carlo method.

From Eq (3.5) and Eq (3.6) we can see that to compute $\delta_2$ and $Q_2$, we need to do an integration (or weighted sum) over all the feature space. We now show that a sampling method can help us reduce the computation. We use a Monte Carlo method that instead of integrating over the whole feature space, just samples some points from the feature space, and compute unweighted average of $\delta_2$ and $Q_2$ over these points. In our implementation, because of the conditional independence assumption on the feature distribution, to draw a sample point $x_1, x_2, x_3$, we can draw $x_1$ following $p_1$ x, $x_2$ following $p_2$ x, $x_3$ following $p_3$ x (all with replacement) and then put them together. FIG. 7(a) and FIG. 7(b) show the results for the Monte Carlo method with 5 sample points and 10 sample points, respectively. As can be seen from the figures, with only 5 sample points, the Monte Carlo method has already clearly outperformed the naive method, and with 10 sample points, the performance of the Monte Carlo method becomes very close to that of the original Loadstar algorithm in which integration is taken over the whole feature space. This experiment demonstrates that our load shedding scheme are particularly suitable for data stream applications, in which quick response time is crucial.

For real-life data, we use a data set of stock streaming price data. We recorded 2 weeks of price data for 100 stocks (NASDAQ-100) as well as the NASDAQ index. For each stock, the close price at the end of each minute is recorded. The streaming price for each stock is considered as a data stream. Therefore, there are 100 data streams and for each data stream, there are observations for 3,900 time units (10 business days×6.5 hours per day×60 minutes per hour) with a time unit of 1 minute. At each time unit for each stock price, the data preparation and analysis task consists of the following simple steps: first, the price for a stock is normalized with respect to the stock's open price on the first day; second, 1 is subtracted from the previous result to get a net change in percentile.

We define the classification problem as the following. At a given time t, a stock is called outperform if its normalized price is higher than that of the NASDAQ index, underperform otherwise. The classification problem is defined as at each time unit t, predicting the class (outperform or underperform) of each stock at time t+1.

Here is the way how we build our classifier. We assume that the NASDAQ index follows the random walk model given in Eq (6.8). (Stock price is one of the best-known examples of time series that behave like random walks.) We assume the noises at different time units are independent. Because we do not have the noise variance $\sigma^2$, at any given time t we use the sample variance $\hat{\sigma}^2$ of the NASDAQ index in the hour before t as an estimation for $\sigma^2$. If we have $y_t$, the NASDAQ index value at time t, then according to our model, the NASDAQ index value at time t+1 follows a Normal distribution:

$$y_{t+1} \sim N y_{t,\hat{\sigma}}^2$$

Figure 8:
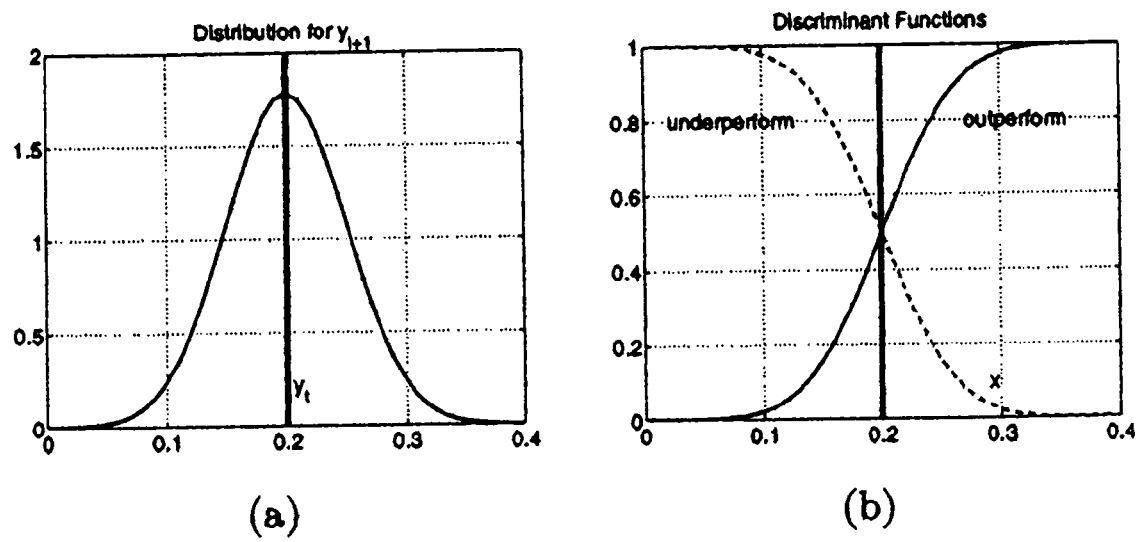
FIG. 8 conveys a posterior probability as a Bayesian classifier.

For our Bayesian classifier, we choose the posterior probability, as shown in FIG. 8, as our discriminant function (here we assume an equal prior distribution for outperform and underperform). For example, if we know the value of a stock at time t+1 to be $\tilde{x}_{t+1}=0.3$, then if we decide the class to be outperform, the probability for the decision to be correct is the area under the curve of the distribution of $y_{t+1}$ for which $y_{t+1}$ is less than 0.3; if we decide the class to be underperform, the probability for this decision to be correct is the area under the curve where $y_{t+1}$ is greater than 0.3. Obviously, conditioning on the value of a stock $\tilde{x}_{t+1}$ at time t+1, the decision will be outperform if $\tilde{x}_{t+1} > y_t$, and underperform otherwise (here we use $\tilde{x}_{t+1}$ because we do not know the real value $x_{t+1}$, i.e., we are making decisions about time t+1 at time t).

For our load shedding scheme, we choose $\delta_2$ and $Q_2$ as they are defined before. For the Markov-chains, because the feature values (i.e., normalized stock price at time t) are continuous, we discretize them into 20 bins with equal width where each bin corresponds to 1 percentile. In this experiment, because the prices for all stocks behave similarly, for simplicity we use a single Markov-chain for all data streams, where the parameters of the Markov-chain are learned using the first hour of data. Again, as a base case, we defined a naive load shedding algorithm, which chooses data streams to have observations shed equally likely.

Figure 9:
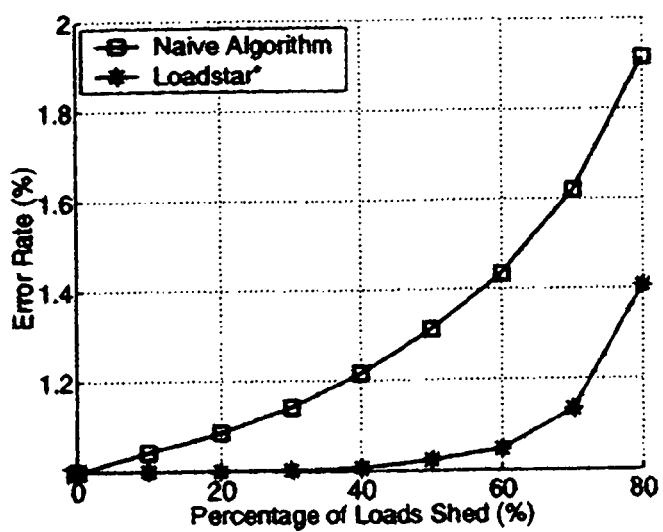
FIG. 9 conveys experimental results for a stock-price application.
Figure 10:
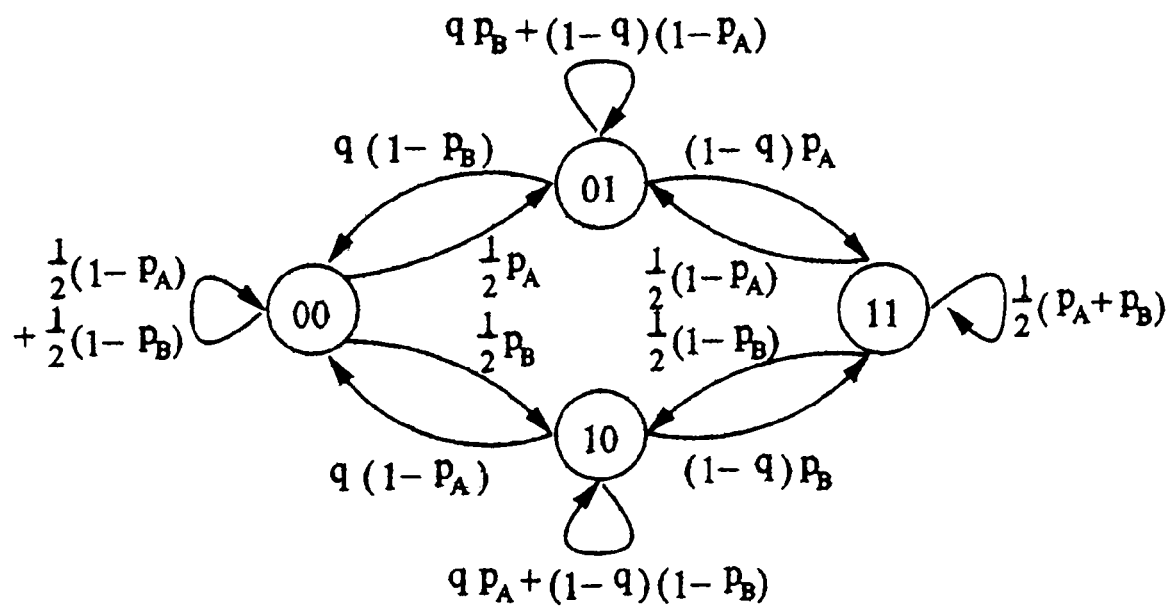
FIG. 10 illustrates a Markov model.

The experimental results are shown in FIG. 9. As can be seen from the figure, because the stock prices do not change very dramatically in a time interval of 1 minute, the error rate for this classification problem is not very high. However, as load shedding becomes more severe, the error rate for the naive algorithm grows continuously. In contrast, when the load shedding level is between 0% and 40%, there is no obvious change in error rates for our load shedding algorithm. In the whole load shedding range, Loadstar always outperforms the naive algorithm.

By way of recapitulation, there has been studied herein a resource allocation problem in mining data streams and in particular, there has been developed a load shedding algorithm, Loadstar, for classifying data streams. The Loadstar algorithm consists of two main components: i) the quality of decision (QoD) measures that are defined based on the classifier, the feature space, and the predicted feature distribution of the following time unit, and ii) the feature predictor which is based on finite-memory Markov-chains, whose parameters can be updated in real time. Extensive experimental results on both synthetic and real-life data sets showed that Loadstar has better performance than a naive algorithm in term of classification accuracy, where its good performance is achieved by automatically focusing on data streams that are more uncertain while shedding data streams whose class labels in the following time unit are more certain. In addition, experiments showed that the Loadstar algorithm can efficiently learn parameters of its Markov-chains and computation in Loadstar can be reduced by using Monte Carlo methods.

It is conceivable to extend the present study in the following directions. First, in this paper we assume that the streams are independent; however, in many real-life applications, one mining task may need multiple data streams and each data stream can be involved in multiple data mining tasks. To take these relationships into consideration in our algorithm is one of our future directions. Second, in accordance with at least one embodiment there has been assumed herein that the data mining task (the classification) is the last stage of the system. Alternatively, one may consider systems in which data mining is just an intermediate computation, e.g., as a filter to decide which data streams to be sent for more detailed analysis. Third, there has been considered herein a simple case that at each given time, one either applies load shedding to a data stream or not; one may conceivably extend the load shedding algorithm to control the communication rates of the data streams, e.g., given many video streams, the frame rate of each stream is proportional to its importance.

It is to be understood that the present invention, in accordance with at least one presently preferred embodiment, includes an arrangement for accepting data streams, an arrangement for ranking the importance of data stream elements, an arrangement for investigating data stream elements of higher importance and an arrangement for shedding a plurality of data stream elements. Together, these elements may be implemented on at least one general-purpose computer running suitable software programs. They may also be implemented on at least one integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirely herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing load shedding in mining data streams, said method comprising the steps of:
   accepting streams of data to be mined, the streams of data containing data stream elements;
   ranking the importance of data stream elements;
   investigating data stream elements of higher importance; and
   thereafter shedding a plurality of data stream elements;
   wherein the plurality of data stream elements shed have a higher quality of decision value than the data stream elements of higher importance and the quality of decision value is based on the predicted distribution of feature values in a next time unit; and
   wherein the quality of decision value is $$Q_1 = E_x \log\left(\frac{f_k(x)}{f_{\bar{k}}(x)}\right).$$

2. The method according to claim 1, further comprising the step of predicting the feature distribution of at least one data stream.

3. The method according to claim 2, wherein said predicting step comprises employing a Markov model.

4. The method according to claim 2, further comprising the step of rendering classification decisions based on the predicted feature distribution of at least one data stream.

5. The method according to claim 4, wherein said step of rendering classification decisions comprises rendering classification decisions with a view to maximizing expected benefits.

6. The method according to claim 1, wherein said ranking step comprises employing a quality of decision metric to assist in classification decisions.

7. The method according to claim 6, wherein said step of employing a quality of decision metric comprises measuring uncertainty in classification decisions.

8. The method according to claim 7, wherein said step of employing a quality of decision metric comprises applying the quality of decision metric to multiple data streams.

* * * * *